US008437566B2

(12) United States Patent
Reinpoldt, III et al.

(10) Patent No.: US 8,437,566 B2
(45) Date of Patent: May 7, 2013

(54) SOFTWARE METHODOLOGY FOR AUTONOMOUS CONCEALED OBJECT DETECTION AND THREAT ASSESSMENT

(75) Inventors: Willem H. Reinpoldt, III, Windermere, FL (US); Robert Patrick Daly, Orlando, FL (US); Iztok Koren, Gainesville, FL (US)

(73) Assignee: Microsemi Corporation, Aliso Viejo, CA (US)

( * ) Notice: Subject to any disclaimer, the term of this patent is extended or adjusted under 35 U.S.C. 154(b) by 841 days.

(21) Appl. No.: 12/338,807

(22) Filed: Dec. 18, 2008

(65) Prior Publication Data

US 2009/0297039 A1    Dec. 3, 2009

Related U.S. Application Data

(60) Provisional application No. 61/014,692, filed on Dec. 18, 2007, provisional application No. 60/914,366, filed on Apr. 27, 2007, provisional application No. 60/914,335, filed on Apr. 27, 2007, provisional application No. 60/941,023, filed on May 31, 2007, provisional application No. 60/951,994, filed on Jul. 26, 2007.

(51) Int. Cl.
*G06K 9/40* (2006.01)

(52) U.S. Cl.
USPC .......................................................... 382/254

(58) Field of Classification Search ............... 25/334, 25/363.02, 559.06; 382/254
See application file for complete search history.

(56) References Cited

U.S. PATENT DOCUMENTS

| | | | | |
|---|---|---|---|---|
| 5,227,800 A | * | 7/1993 | Huguenin et al. | 342/179 |
| 5,421,330 A | * | 6/1995 | Thirion et al. | 600/425 |
| 6,104,365 A | * | 8/2000 | Towler et al. | 345/89 |
| 6,570,613 B1 | * | 5/2003 | Howell | 348/219.1 |
| 2003/0012453 A1 | * | 1/2003 | Kotlikov et al. | 382/275 |
| 2003/0137486 A1 | * | 7/2003 | Wilke | 345/156 |
| 2003/0163042 A1 | * | 8/2003 | Salmon | 600/436 |
| 2005/0099330 A1 | * | 5/2005 | Hausner et al. | 342/22 |
| 2005/0110672 A1 | * | 5/2005 | Cardiasmenos et al. | 342/27 |
| 2005/0129311 A1 | * | 6/2005 | Haynes et al. | 382/170 |
| 2006/0232823 A1 | * | 10/2006 | Hooper | 358/3.27 |
| 2008/0100510 A1 | * | 5/2008 | Bonthron et al. | 342/373 |

OTHER PUBLICATIONS

International Search Report, International Application No. PCT/US08/87497, mailed May 5, 2009.

* cited by examiner

*Primary Examiner* — Gregory F Cunningham
(74) *Attorney, Agent, or Firm* — Holland & Hart LLP (57) ABSTRACT

A system and method for autonomous concealed object detection and threat assessment. Image data is received from a millimeter wave imaging device comprising at least one scan of a scene. The image data is enhanced thereby creating enhanced image data comprising a plurality of enhanced image pixels. The enhanced image data is evaluated thereby identifying at least one subject within the enhanced image data. The subject is separated from a background within the enhanced image data. The contrast of the subject is enhanced within the enhanced image data. Concealed physical objects associated with the subject within the enhanced contrast image data are detected, thereby detecting at least one concealed object associated with the subject. A representation of the subject and the concealed physical object is displayed on a display device.

50 Claims, 10 Drawing Sheets

Raw Millimeter Wave Image

Raw Pixel values = 29,650-30,124

Thresholded Millimeter Wave Image

Thresholded Pixel values = 29,750-29,934

Raw Millimeter Wave Image

Raw Pixel values = 29,650-30,124

Thresholded Millimeter Wave Image

Thresholded Pixel values = 29,750-29,934

*FIG. 3*

```
// C algorithm for thresholding image for subject extraction int x, y, min, max, range, min_pixel, max_pixel;
float low_thres=.2, high_thres=.6;                    // low 20%, high 60%

// initialize min, max
min=pixel[x_start][y_start];
max=min;

// find min, max pixels in image
for (y=y_start; y<=y_end; y++) {
        for (x=x_start; x<=x_end; x++) {
                if (pixel[x][y] < min) min=pixel[x][y];
                if (pixel[x][y] > max) max=pixel[x][y];
        }
}

// calculate min/max threshold values
range = max-min;
min_pixel = min + (range*low_thres);
max_pixel = min + (range*high_thres);

// threshold pixels in image
for (y=y_start; y<=y_end; y++) {
        for (x=x_start; x<=x_end; x++) {
                if (pixel[x][y] < min_pixel) pixel[x][y]=min_pixel;
                if (pixel[x][y] > max_pixel) pixel[x][y]=max_pixel;
        }
}
```

```
// C algorithm for concealed object detection using pixel values int x, y, sum=0, count=0, avg, alarm=0;
int low_thres=30, high_thres=30;                              // low, high values // calculate average subject pixels in image
for (y=y_start; y<=y_end; y++) {
            for (x=x_start; x<=x_end; x++) {
                        if (pixel [x] [y] >0) {                   // if >0, subject
                                    sum += pixel [x] [y];
                                    count++;
                        }
            }
}
avg = sum/count;

// increment alarm count if concealed object found
for (y=y_start; y<=y_end; y++) {
            for (x=x_start; x<=x_end; x++) {
                        if (pixel [x] [y] >0) {                           // if >0, subject
                                    if (pixel [x] [y] < avg-low_thres) alarm++;
                                    if (pixel [x] [y] > avg+high_thres) alarm++;
                        }
            }
}
```

```
Double window modified trimmed mean filter

Inputs: NumberOfRows × NumberOfColumns image
        Moving window $W_1$, $|W_1| = N = 2k+1$
        Moving window $W_2$, $|W_2| = M, M > N$
        Positive real number $q$
Output: NumberOfRows × NumberOfColumns image for $i = 1$ to NumberOfRows
    for $j = 1$ to NumberOfColumns
        place the windows $W_1$ and $W_2$ at $(i,j)$
        store the image values inside $W_1$ in $x = (X_1, X_2, \ldots, X_N)$
        find the median $X_{(k+1)}$ of $x$
        let $Sum1 = 0$, $Sum2 = 0$
        store the image values inside $W_2$ in $y = (X_1, X_2, \ldots, X_M)$
        for $m = 1$ to $M$
            if $|X_m - X_{(k+1)}| \leq q$ then
                let $Sum1 = Sum1 + X_m$
                let $Sum2 = Sum2 + 1$
            end
            let $Output(i,j) = Sum1/Sum2$
        end
    end
end
```

*FIG. 11*

SOFTWARE METHODOLOGY FOR AUTONOMOUS CONCEALED OBJECT DETECTION AND THREAT ASSESSMENT

This application claims priority from U.S. Provisional Application Ser. No. 61/014,692 entitled "Software Methodology for Autonomous Concealed Object Detection and Threat Assessment" filed Dec. 18, 2007, the entire disclosure of which is incorporated herein by reference.

This patent application additionally relates to the subject matter of U.S. Provisional Patent Application No. 60/914,366 entitled "Integration of a Synthetic Vision Display of Millimeter Wave Imagery to Simplify User Interface and Improve Concealed Object Detection Assessment" filed Apr. 27, 2007, U.S. Provisional Patent Application No. 60/914,335 entitled "Software Techniques Allowing for Real-Time Video Playback Time-Synchronized with Millimeter Wave Imagery" filed Apr. 27, 2007, U.S. Provisional Patent Application No. 60/941,023 entitled "Software Techniques to Autonomously Detect a Subject's Range and Direction of Motion Allowing a Real-Time Change to Automated Threat Detection Methodology" filed May 31, 2007, and U.S. Provisional Patent Application No. 60/951,994 entitled "Graphical User Interface Promoting Improved Operation And Threat Assessment For A Millimeter Wave Concealed Object Detection Camera System" filed Jul. 26, 2007. The entire disclosures of those applications are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of concealed object detection systems, and in particular to a method and system to interfacing with and analyzing data from differing image sensors.

SUMMARY OF THE INVENTION

In one embodiment, the presently disclosed system and method is a collection of software methods, techniques, and algorithms functioning as a component to a millimeter wave imaging system which includes a computer, visible spectrum color camera, millimeter wave camera, operator display, computer software and other components. The system and method provides a means to coordinate and control the capture of millimeter wave imagery and color visual imagery and store the data inside a computer for subsequent analysis and evaluation by the computer software. The system and method further provides an array of data analysis and transformation procedures and algorithms to interpret and display image data collected by, without limitation, millimeter wave, infra-red (IR), and visual spectrum cameras.

In one embodiment, the invention is a method. Image data is received from a millimeter wave imaging device comprising at least one scan of a scene. The image data is enhanced using at least one computing device, using at least one enhancement method, thereby creating enhanced image data comprising a plurality of enhanced image pixels. The enhanced image data is evaluated, using the at least one computing device, using at least one identification method, thereby identifying at least one subject within the enhanced image data. The subject is separated from a background within the enhanced image data, using the at least one computing device, using at least one separation method. The contrast of the subject is enhanced within the enhanced image data, using the computing device, using at least one enhancement method, thereby creating enhanced contrast image data. Concealed physical objects associated with the subject within the enhanced contrast image data are detected, using the computing device, using at least one detection method, thereby detecting at least one concealed object associated with the subject. A representation of the subject and the concealed physical object is displayed on a display device.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings.

The present invention is described below with reference to block diagrams and operational illustrations of methods and devices to acquire and analyze, without limitation, millimeter wave imaging data, IR imaging data, and visible spectrum imaging data. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, application specific integrated circuit (ASIC), or other programmable data processing apparatus, such that the instructions, which execute via the processor of the computer or other programmable data processing apparatus, implements the functions/acts specified in the block diagrams or operational block or blocks. In some alternate embodiments, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In the embodiments that follow, it should be borne in mind that the methods and procedures described herein including, without limitation, hardware control and operations procedures, data acquisition methods and procedures, and data analysis methods, procedures and algorithms are preferably implemented in such a manner that they are executed autonomously within the host system, which is to say without user or operator intervention. Where user intervention is preferable within a procedure, it is explicitly stated. Notwithstanding the above, however, the scope of this disclosure is also intended to cover embodiments of the methods, procedures, and algorithms which are controlled in whole, or in part, by the system operator through some manner of conventional user interface such as, for example, a graphical user interface (GUI).

In an embodiment, the system is comprised of software which interfaces to computer hardware, other software and external devices such as frame buffers, millimeter wave sensor controllers, hard disk drives and the like. The software interfaces to and controls the millimeter wave sensor electronics including control and timing for the scanning mirror, Peltier cooling, sensor gain/offset, zero referencing diverter gate, pixel clock, and pixel readout.

The system furthermore interfaces to and controls the color camera electronics including control of focus and iris (aperture), video format (NTSC, PAL), scanning frequency, offset and gain, color balancing, and other video parameters. The color imagery may be captured either by video frame buffer electronics, a serial port interface (Camera Link®), or a computer interface (Universal Serial Bus (USB), IEEE-1394 (Firewire®), Ethernet, or other computer interface).

The system may furthermore interface to and control optional infra-red camera electronics, including control of focus and iris (aperture), video format (NTSC, PAL), scanning frequency, offset and gain, temperature referencing and zeroing, and other video parameters. The infra-red imagery may be captured either by video frame buffer electronics, a serial port interface (Camera Link), or a computer interface (USB, Firewire, Ethernet, or other computer interface).

The system may furthermore interface to the user via a graphical user interface (GUI), for example, the GUI described in U.S. Provisional Patent Application No. 60/951, 994 entitled "Graphical User Interface Promoting Improved Operation And Threat Assessment For A Millimeter Wave Concealed Object Detection Camera System", included by reference in this application.

Figure 1:
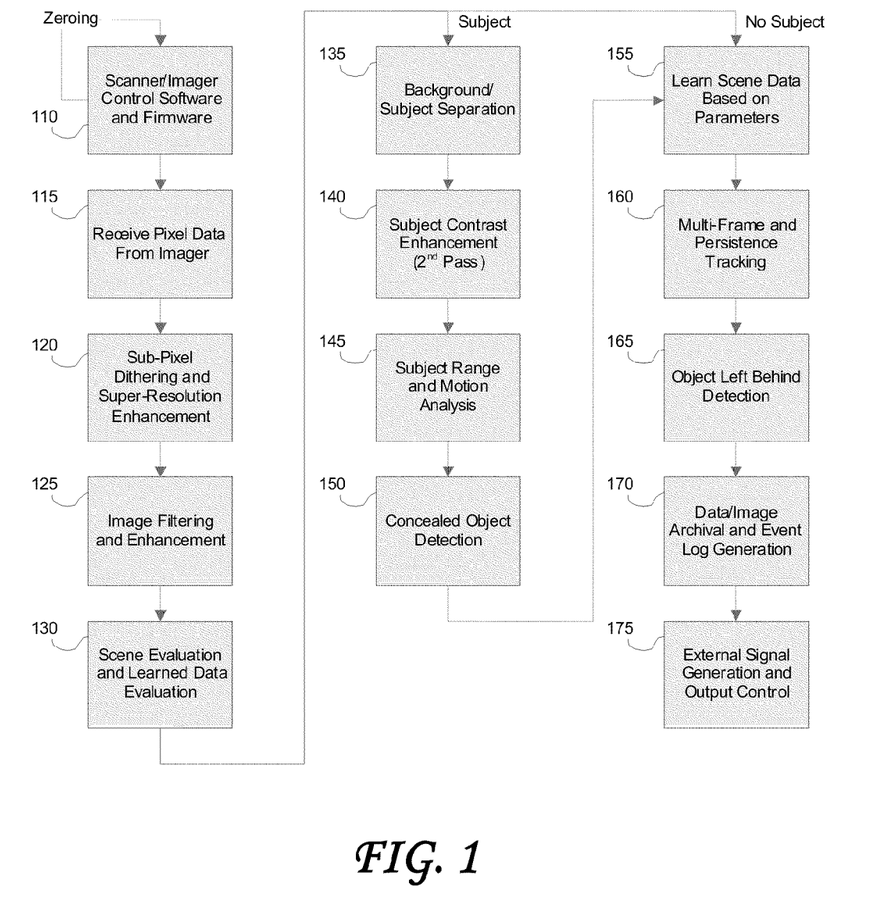
FIG. 1 illustrates one embodiment of a process to analyze and evaluate acquired millimeter wave imagery and determine whether or not the scene contains one or more persons and whether such persons are carrying concealed objects.
Figure 2:
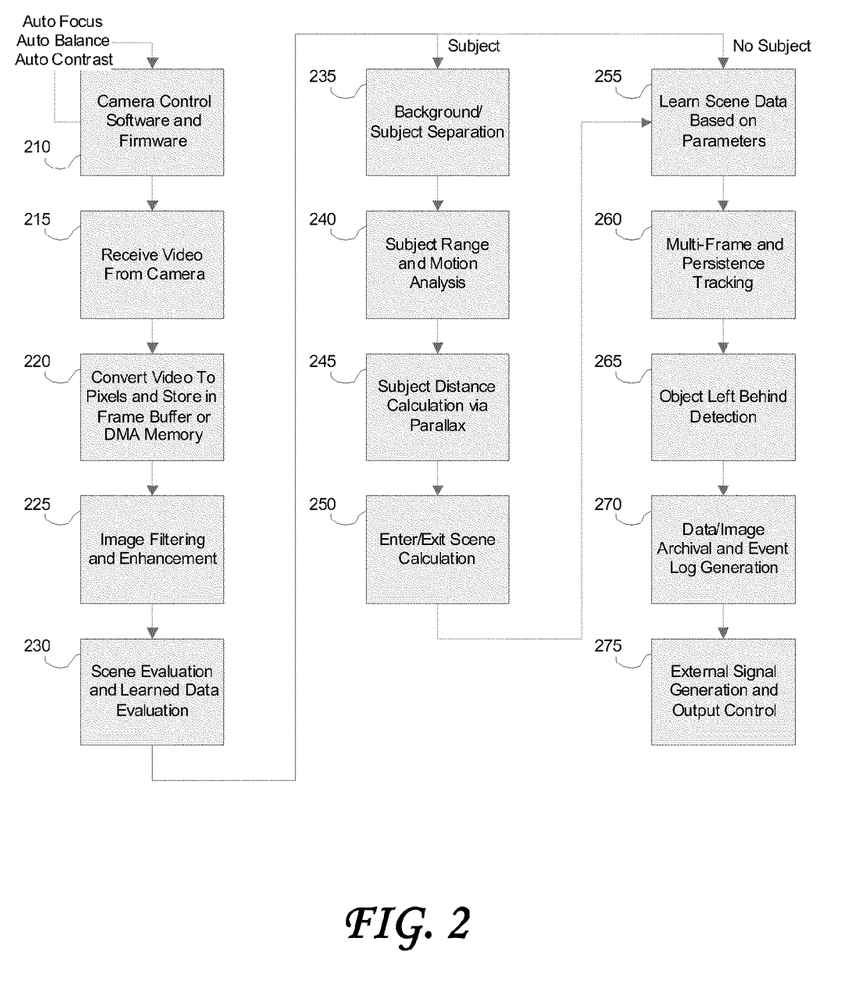
FIG. 2 illustrates one embodiment of a process to analyze and evaluate acquired visible-spectrum color imagery and determine whether or not the scene contains one or more subjects within the field of view of the camera(s).

Referring first to FIG. 1, in one embodiment, the system implements the algorithms necessary to analyze and evaluate the acquired millimeter wave imagery and determine whether or not the scene contains one or more persons (subjects) within the field of view of the camera(s) and whether or not the persons are carrying concealed objects. The system may further implement algorithms necessary to analyze and evaluate acquired visible-spectrum color imagery and determine whether or not the scene contains one or more subjects within the field of view of the camera(s). A flowchart diagram for one such embodiment is shown in FIG. 2.

Additionally, the system may include embodiments of procedures and algorithms involving evaluation of the color image, the millimeter wave image, an image from an optional infra-red camera, or any combination. Such procedures and algorithms give the system ability to analyze and evaluate input from multiple image sensors based on differing technologies and differing imaging spectrums including, but not limited to, visible light, infra-red and millimeter wave energy. Additionally, such procedures and algorithms may employ coding, learn-modes or artificial intelligence to discern a scene without a person from a scene with a person(s), that is to say, to detect the presence or absence of a person.

The system may implement algorithms to analyze and evaluate the stored imagery and determine the boundary of each person in the scene in such a manner so as to computationally extract or separate the person(s) from the scene. The person separation may be performed using a number of techniques. In one embodiment, established blob analysis and feature extraction algorithms may be used to isolate the boundaries of each person. In another embodiment, image subtraction techniques may be used to isolate a person(s) from the current video field or frame versus a previous "learned" image void of persons. In another embodiment, motion analysis algorithms may be used to detect movement/motion between successive fields or frames of video and use the resulting information for isolating the person(s).

Figure 3:
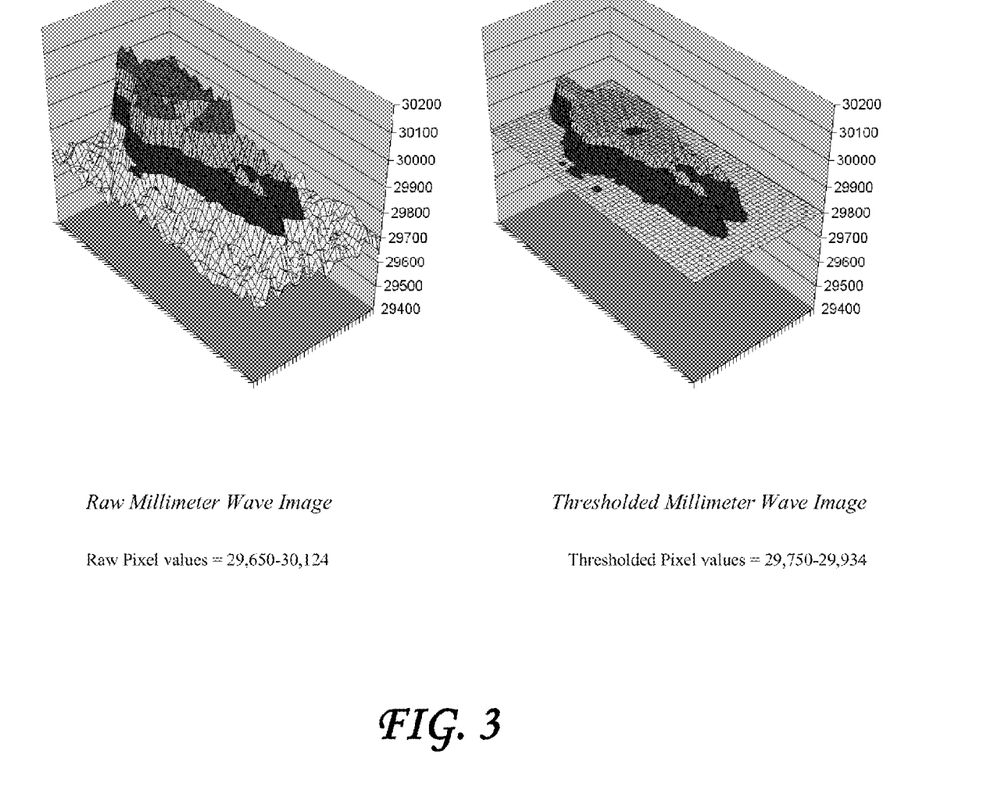
FIG. 3 illustrates one embodiment of thresholding raw millimeter wave image data using contrast differences, edge presence and/or pixel levels to determine the boundaries of a subject.
Figure 4:
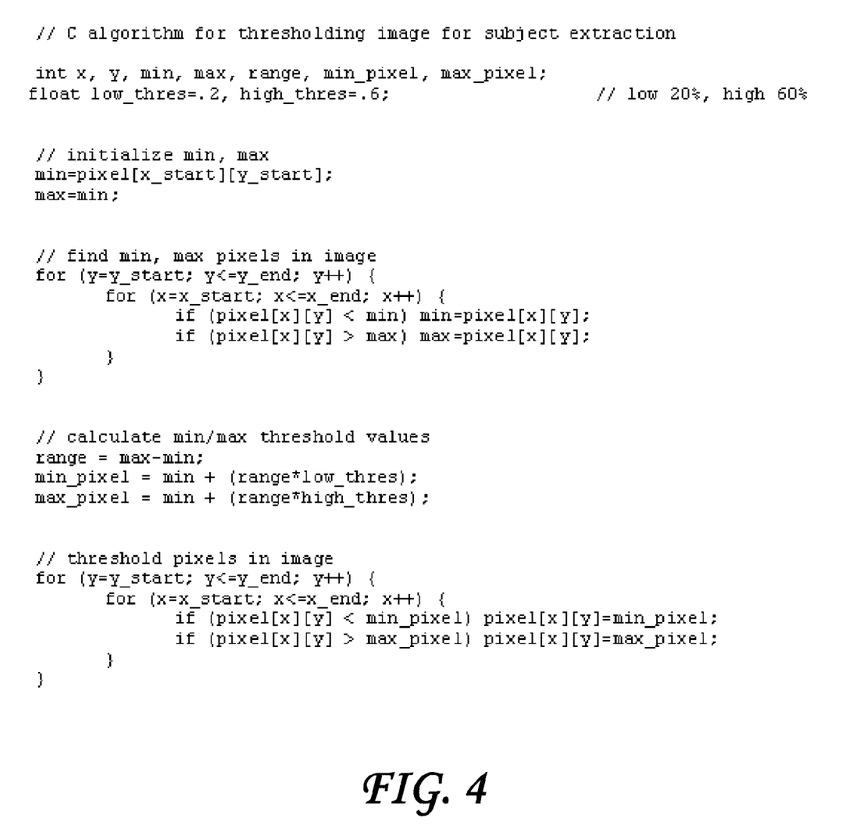
FIG. 4 illustrates one embodiment of an algorithm for thresholding an image for a subject

In yet another embodiment, algorithms may be used to determine contrast differences, edge presence and/or pixel levels to determine the boundaries of each person. A visual example of such an embodiment is shown in FIG. 3 and an algorithmic example of such an embodiment is shown in FIG. 4. In other embodiments, artificial intelligence algorithms may be used to determine the boundaries of each person. A combination of one or more of the previous techniques may be used to determine the boundaries of each person.

The person separation may be represented using a number of different techniques. In one embodiment, the boundaries of each person may be represented with a software pixel mask containing either binary values (e.g., 0=no person, 1=person) or non-binary values where the value is the probability or confidence level that a pixel represents a person (e.g., 0=lowest probability, 255=highest probability). In another embodiment, the pixel values representing the found person(s) may be copied to a separate area of memory, optionally using a sentinel value (e.g., 0) to denote pixels in the background. In yet another embodiment, the boundaries of the found person(s) could be expressed mathematically, such as via Bezier curves, pixel path mapping or some other representation.

In addition to person detection, the invention further provides the ability to classify the person(s) in the scene with respect to distance, contrast of the person to the background, number of persons in the scene, and the integrity of each person's image (determine if person's image is clipped in the field of view or obscured by other objects/people in the scene). In one embodiment, this can be performed using standard blob analysis algorithms, and evaluating the resulting blob information for size, shape, position, uniformity, symmetry and/or blob count.

In one embodiment, the system has the ability to operate on the full resolution images received from each camera (e.g., 16-bits per pixel for millimeter wave camera, 24-bits per pixel for color camera, 12-bits per pixel for infra-red camera) and/or the full quantity of pixels in the image, or operate on a subset of the resolution. In one embodiment, the millimeter wave image is algorithmically scaled to occupy 8-bits of data whose minimum is the lowest pixel value of the millimeter wave image (which might not be zero due to ambient millimeter wave energy) and whose maximum is the highest pixel value of the millimeter wave image.

Figure 5:
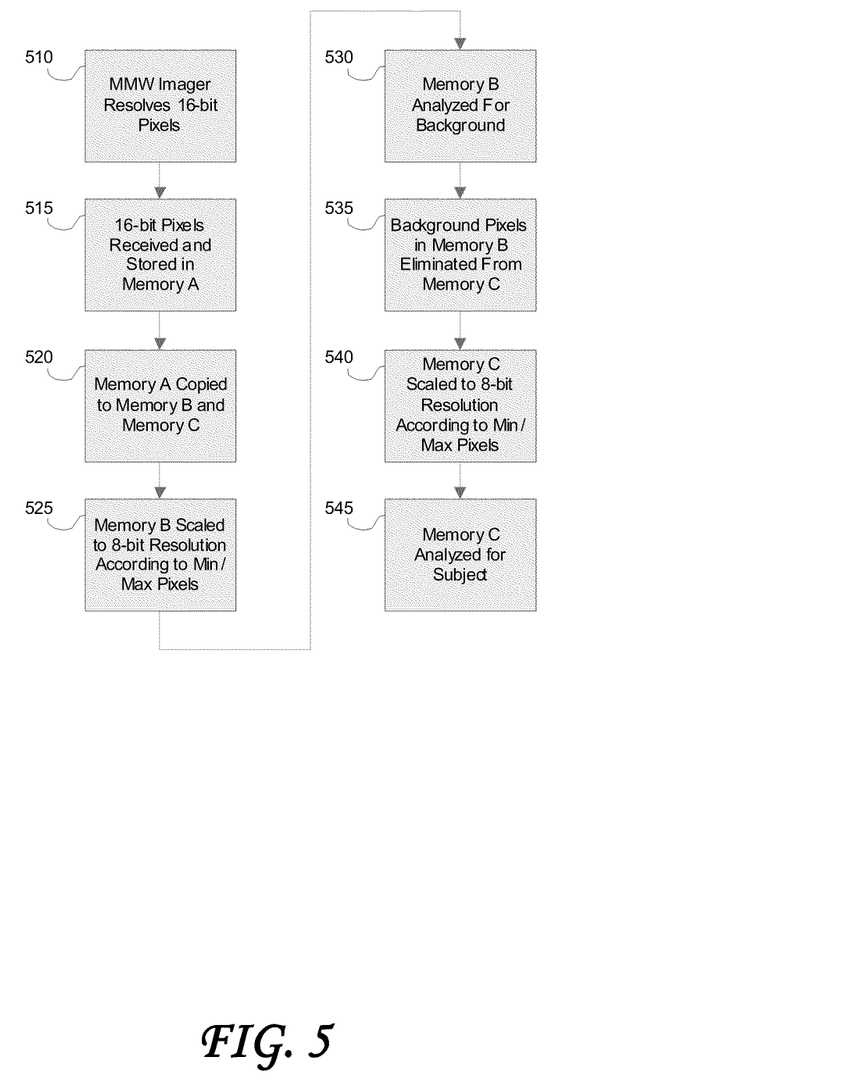
FIG. 5 illustrates one embodiment of a process for scaling of data re-calculated in a "second pass" to range between the minimum and maximum pixel values of just a person's image, eliminating the pixel ranges unique to the background image.

Referring to next FIG. 5, in another embodiment, the scaling of the data may be re-calculated in a "second pass" to range between the minimum and maximum pixel values of just the person's image, eliminating the pixel ranges unique to the background image.

The system may implement algorithms necessary to analyze and evaluate the stored imagery and determine the presence of concealed objects on the person(s) in the scene. The concealed objects may be detected using a variety of techniques operating either separately or in concert. In one embodiment, a concealed object may be detected by evaluating its contrast versus that of the person and/or background. In this case, the algorithm would examine the difference in pixel values between a suspected concealed object and the subject.

Figure 6:
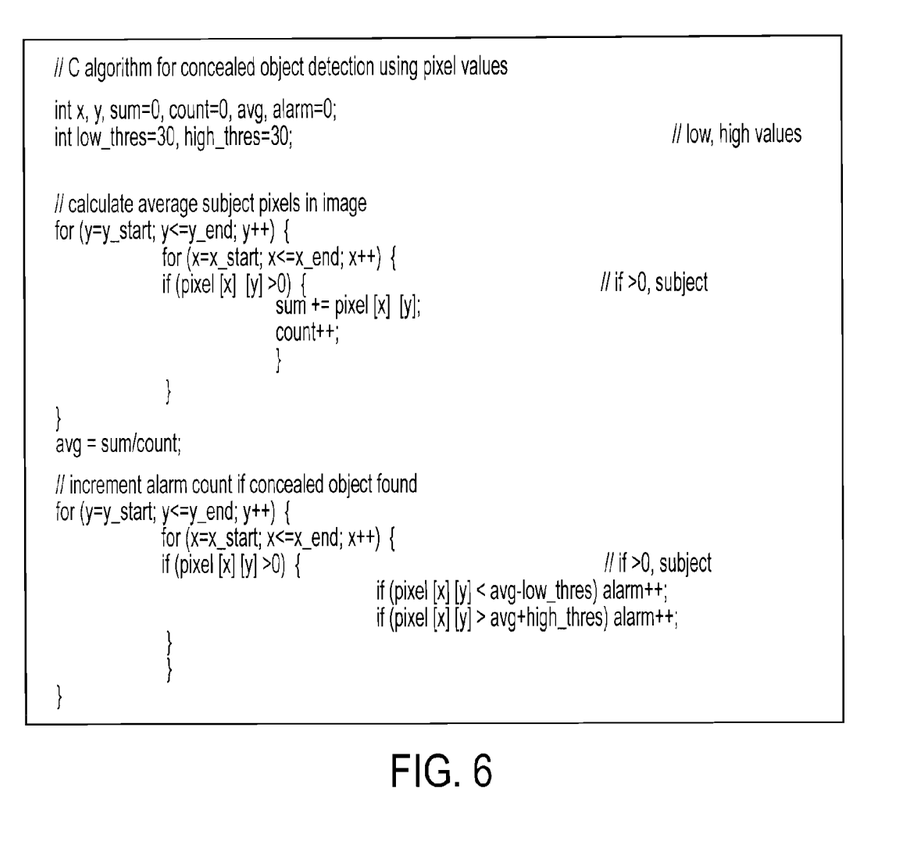
FIG. 6 illustrates one embodiment of a process for detecting concealed using absolute pixel values.

The algorithm may be implemented to detect objects of greater pixel value ("hot" objects), of lesser pixel value ("cold" objects) or both. In another embodiment, a concealed object may be detected by evaluating its edges within the scene. In this case, the edge detection may use Laplace (or other) convolutions or transforms, single gradient image processing or double gradient image processing techniques. In a third embodiment, the concealed object may be detected by evaluating its texture, smoothness or spatial frequency with respect to the texture, smoothness or spatial frequency of the subject. In a fourth embodiment, the concealed object may be detected by evaluating its absolute pixel values, for example, using the algorithm in FIG. 6.

The invention may implement algorithms necessary for indicating and communicating to the user the process and status of image analysis, and the presence of a concealed physical object(s), if any. The algorithms can accomplish this using a variety of techniques, some or all of which may be implemented within the standard millimeter wave concealed object detection camera system. In one embodiment, the Blue Man technique may be used, for example, as described in U.S. Provisional Patent Application No. 60/914,366, "Integration of a Synthetic Vision Display of Millimeter Wave Imagery to Simplify User Interface and Improve Threat Detection and Assessment" included by reference in this application. Such an embodiment provides an intuitive and "at-a-glance" indication of the software's success in locating concealed objects on the person. Concealed objects are indicated using computer generated colored highlights overlaying the location of the detected concealed object(s) and simultaneously indicating size and severity of the object(s).

In another embodiment, the algorithm may generate Event History Logs or Indicator Icons, for example, as described Provisional Patent 60/951,994 "Graphic User Interface Promoting Improved Operation and Threat Assessment for a Millimeter Wave Concealed Object Detection Camera System" included by reference in this application. In yet another embodiment, the algorithms may include the rendering of computer generated graphic highlights and readouts overlaying the millimeter wave, Blue Man, infra-red, or color images or any combination thereof, for example, as described in U.S. Provisional Patent Application No. 60/914,366 entitled "Integration of a Synthetic Vision Display of Millimeter Wave Imagery to Simplify User Interface and Improve Concealed Object Detection Assessment" included by reference in this application.

The system may optionally provide the ability to detect objects left behind during the people screening process. In one embodiment, the algorithms would compare the scene before a person is present to the scene after the person has left and detect any differences in the color, millimeter and/or infra-red images. Any discrepancies found would be evaluated in terms of color, texture, millimeter wave energy, size, shape, perimeter, grouping, distribution, location and/or other attributes, either considered individually or in any combination. Objects that are thereby determined to be present in the current imagery, but absent in the previous imagery would be classified as object(s) left behind and reported accordingly. This functionality is indicated in Step 165 of FIG. 1 and Step 265 of FIG. 2.

The system may provide an intuitive and powerful mechanism for conveying and modifying system and algorithmic parameters contained in or used by the object detection software, for example, using a GUI on a system display or control panel. Display and modification of parameters can be performed when the camera is either offline (not performing detection) or online (while performing detection) in real-time without interrupting the detection process, greatly simplifying setup and adjustment of the detection parameters.

Additionally, the system may optionally implement algorithms and procedures to automatically reconfigure the analysis process for normal-range and close-up imaging, reducing operator effort. An example of this is described in U.S. Provisional Patent Application No. 60/941,023 entitled "Software Techniques to Autonomously Detect a Subject's Range and Direction of Motion Allowing a Real-Time Change to Automated Object Detection Methodology" included by reference in this application.

Figure 7:
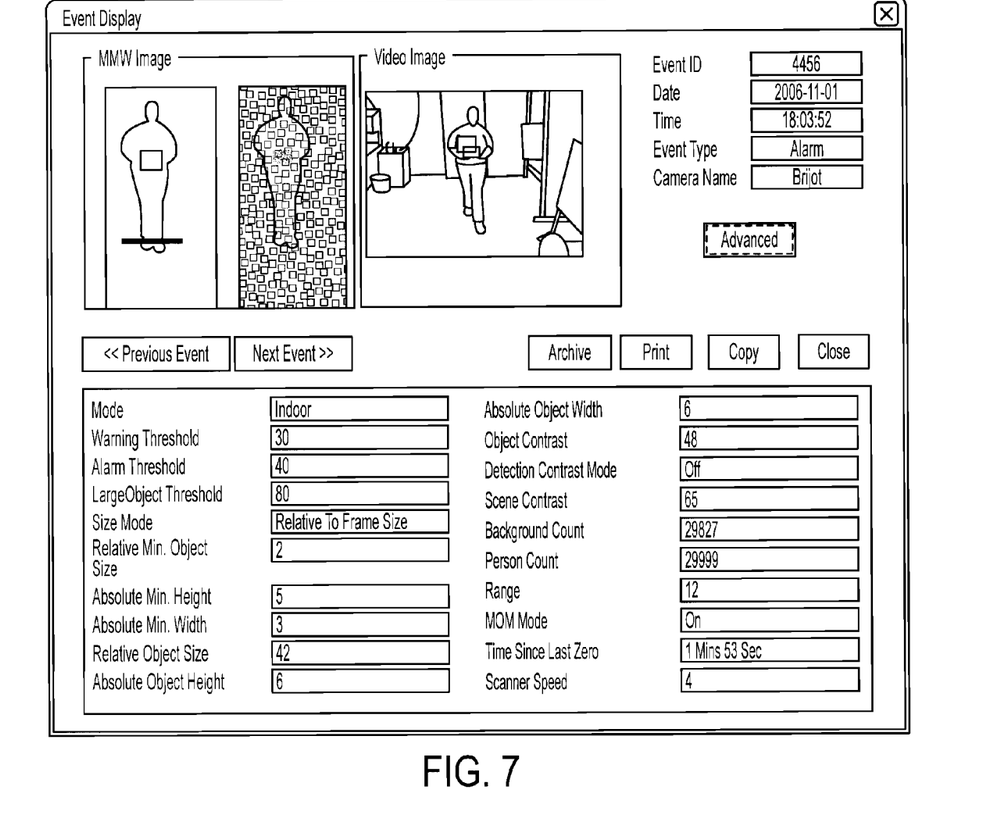
FIG. 7 illustrates one embodiment of the of an Event Log and the data archived in the Event Log.

The system may further include a mechanism for storage and retrieval of Event Log information, archiving the history of previous events and detections indicated by the camera's detection software. The archived information may be encoded with information including, but not limited to, time and date of the detection, parameter and sensitivity settings, and detection criteria and results. One embodiment of the Event Log and the data archived is shown in FIG. 7. The system may also include intelligence for performing periodic zero-referencing (zeroing) of the millimeter wave sensor based on, but not limited to, time, in-activity of people detection and/or temperature of the millimeter wave sensor.

The system may also implement algorithms for "learn modes" for the various image sensors including color camera, millimeter wave camera and optional infra-red camera. In one embodiment, the learn mode of the millimeter wave camera can register and remember the presence of millimeter wave energy in an empty scene (no people present) and then apply that knowledge to aid in people detection and subsequent concealed object detection.

In this case, the algorithms may detect the presence of hot/cold water pipes concealed within walls in the camera's field of view and mask their presence and/or effect in subsequent image processing. In this case, a learn pixel map may be created by the algorithm representing pixels affected by ambient conditions, either on a binary basis (0=not affected, 1=affected) or on a finer/non-binary scale (e.g., 0=not affected, 255=completely affected). In another embodiment, the learn mode of the color camera can register and remember a view of the scene without a person and then utilize this "background" information to aid in separating a subsequent person(s) entering the scene.

For dynamically changing scenes, either multiple learned images may be utilized or a single layered or information-rich learned image can be used which includes information concerning the dynamic nature of the scene. To compliment this approach, a sensitivity pixel map can be employed to provide pixel-by-pixel information on the sensitivity and/or stability of each pixel.

Figure 8:
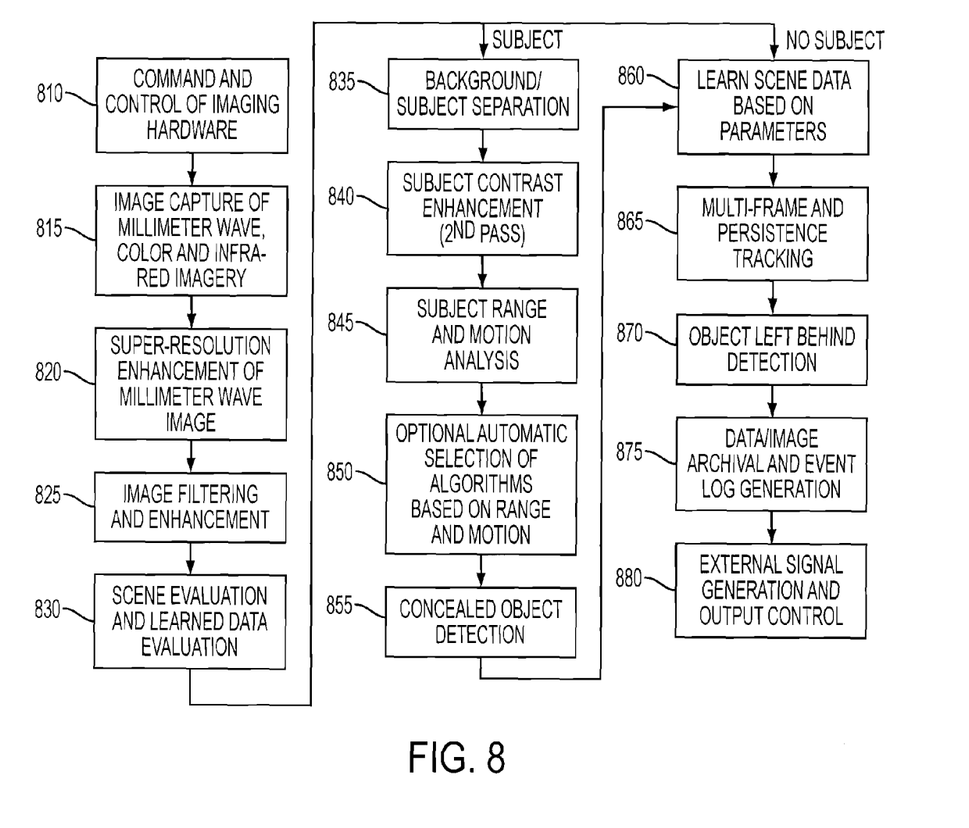
FIG. 8 illustrates one embodiment of a process for FIG. 8 analyzing and evaluating imagery from the color, millimeter wave and optional infra-red cameras.

In one embodiment, the invention performs the Steps shown in FIG. 8 in analyzing and evaluating imagery from the color, millimeter wave and optional infra-red cameras. In one implementation, the person and object detection software may be implemented as a method, subroutine or module to the main executive program. This allows the detection engine to operate unchanged on current images, previously cached images (video playback mode), or archived/downloaded images.

The system includes the conventional algorithms and logic necessary for controlling external image acquisition hardware including, but not limited to, control of camera timing, format, resolution, offset, gain, zoom, iris, aperture, brightness, contrast and color saturation. The system also includes the conventional algorithms and logic necessary for acquiring imagery from external image acquisition hardware including, but not limited to, control of frame buffer timing, scanning mirror timing, pixel data burst size, communication protocols such as binary, USB, Firewire, and Ethernet, and direct memory access (DMA) requirements.

In one embodiment, images received from the color video camera may be evaluated in the RGB color space (Red, Green Blue), or the HSV color space (Hue, Saturation, Intensity). The color images may also be converted to a Gray scale equivalent. The corresponding gray scale level for a RGB color pixel can be calculated as gray=max (R, G, B) or as a linear combination of R, G, and B values. The corresponding gray scale level for a HSV color pixel can be calculated as gray=V. Evaluating images using the HSV color space allows for simple color matching. By performing full color analysis of the video image, much greater information may be gleaned from the image aiding scene analysis and subject/background separation.

In one embodiment, subsequent to receiving a new millimeter wave image, the invention performs dithering/sub-pixel resolution enhancement of the image data. In one embodiment, this is performed in the system's controller hardware. In another embodiment, this may be performed in a host computer. The system includes a dither algorithm which performs a 2-pixel average of overlapping pixels of the dithered and interlaced images to produce a super-resolution image of twice the horizontal and vertical pixel resolution.

In addition to the 2-pixel average dither algorithm, the system may include a selection of other resolution enhancement algorithms that can be selected in the software's configuration file, as a high-level user access code parameter or some other means. Examples of alternate algorithms include drizzle, interlacing and shift-and-add.

The following paragraphs detail two approaches to improve the performance of the 2-pixel average sub-pixel dither algorithm. In the discussion a limited number of pixels are considered. For normal embodiment, all pixels would be considered using the same methodology.

Figure 9:
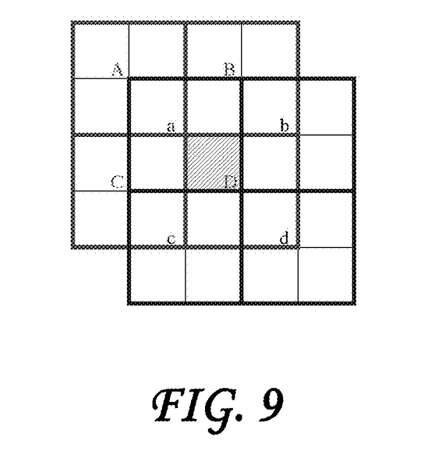
FIG. 9 illustrates one embodiment of a 2-pixel average algorithm for evaluation of the pixels of two successive scans.

Referring next to FIG. 9, in one embodiment, the system's 2-pixel average algorithm evaluates the pixels of two successive scans, ABCD and abcd, overlapping by ½ pixel in the horizontal and vertical directions. Each sub-pixel is created from a 2-point average between overlapping pixels. For the sub-pixel shown in FIG. 9 below, only the upper left and lower right corners of the pixel are evaluated, as these corners are aligned with the center of pixels a and D respectively. FIG. 9, together with Equation 1 below describes the embodiment.

$$\text{Sub-pixel} = \tfrac{1}{2}(a+D) \quad \text{Equation 1}$$

An alternate embodiment provides an increase in the sub-pixel dither accuracy by performing a 4 point average, evaluating all four corners of the sub-pixel. As illustrated in FIG. 9, the upper right corner can be evaluated as average (B, D, a, b) while the lower left corner can be evaluated as average (C, D, a, c). The computation of these two additional corners is more complicated since they do not fall in the middle of a pixel but on pixel boundaries in both the horizontal and vertical directions. The final value of the sub-pixel would then become an average of all four corners.

$$\text{Sub-pixel} = \tfrac{1}{4}[a+D+\tfrac{1}{4}(B+D+a+b)+\tfrac{1}{4}(C+D+a+c)] \quad \text{Equation 2}$$

$$\text{Sub-pixel} = \tfrac{1}{4}[\tfrac{6}{4}a+\tfrac{6}{4}D+\tfrac{1}{4}(B+b+C+c)] \quad \text{Equation 3}$$

$$\text{Sub-pixel} = \tfrac{3}{8}(a+D)+\tfrac{1}{16}(B+b+C+c) \quad \text{Equation 4}$$

From Equation 4 above, the original dither arguments, a and D, are responsible for 86% of the sub-pixel, while the new arguments are responsible for 14%. Computation of the sub-pixel value is aided by the fact that all divisors in the equation are base 2 and can be implemented using common shift-right instructions (eg, divide by 16=shift-right 4 bits). Equation 4 may be simplified for embodiment in an algorithm as shown in Equation 5, resulting in 5 adds, 1 multiply and 1 shift right by 4 instruction per sub-pixel.

$$\text{Sub-pixel} = [6(a+D)+(B+b+C+c)]/16 \quad \text{Equation 5}$$

Figure 10:
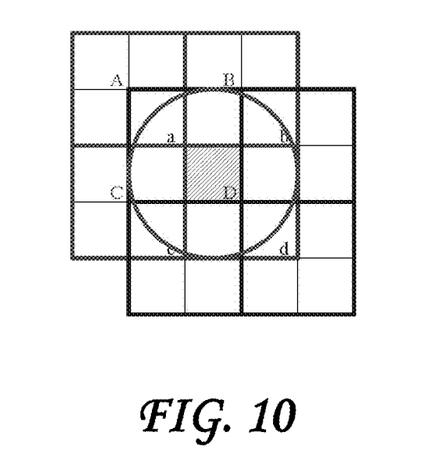
FIG. 10 illustrates one embodiment of a use of a Point Spread Function for sub-pixels.

While the above approach performs a 14% more thorough calculation of a sub-pixel, it is only is a gross approximation of the effect of neighboring pixel values to the sub-pixel. A more accurate approach is to estimate the Point Spread Function for the sub-pixel as shown in FIG. 10. In FIG. 10, the approximation of the sub-pixel involves contributions from not only the four corners of the sub-pixel but also the contributions from above, below, left and right forming an 8-way approximation. For the sub-pixel indicated in the figure, the contribution of pixel a would be 7/18th (3½ pixels out of 9), pixel b would be 3/18th, and so on. The equation for a sub-pixel then becomes:

$$\text{Sub-pixel} = (\tfrac{7}{18}a+\tfrac{3}{18}b+\tfrac{3}{18}c+\tfrac{1}{18}d)+(1;18A+\tfrac{3}{18}B+\tfrac{3}{18}C+\tfrac{7}{18}D) \quad \text{Equation 6}$$

$$\text{Sub-pixel} = (7a+3b+3c+d+A+3B+3C+7D)/18 \quad \text{Equation 7}$$

From equation 7 above, pixels a and D contribute 14/28=50% to the value of the sub-pixel. This is a sharp improvement to the 2-pixel average algorithm in which pixels a and D contribute 100% to the value, and to the 4 point average technique discussed above in which pixels a and D contribute 86% to the value of a sub-pixel.

Equation 7 above can be simplified for embodiment in an algorithm as follows:

$$\text{Sub-pixel} = [7(a+D)+3(b+c+B+C)+d+A]/18 \quad \text{Equation 8}$$

Resulting in 7 adds, 2 multiplies and 1 divide instruction per sub-pixel.

Figure 11:
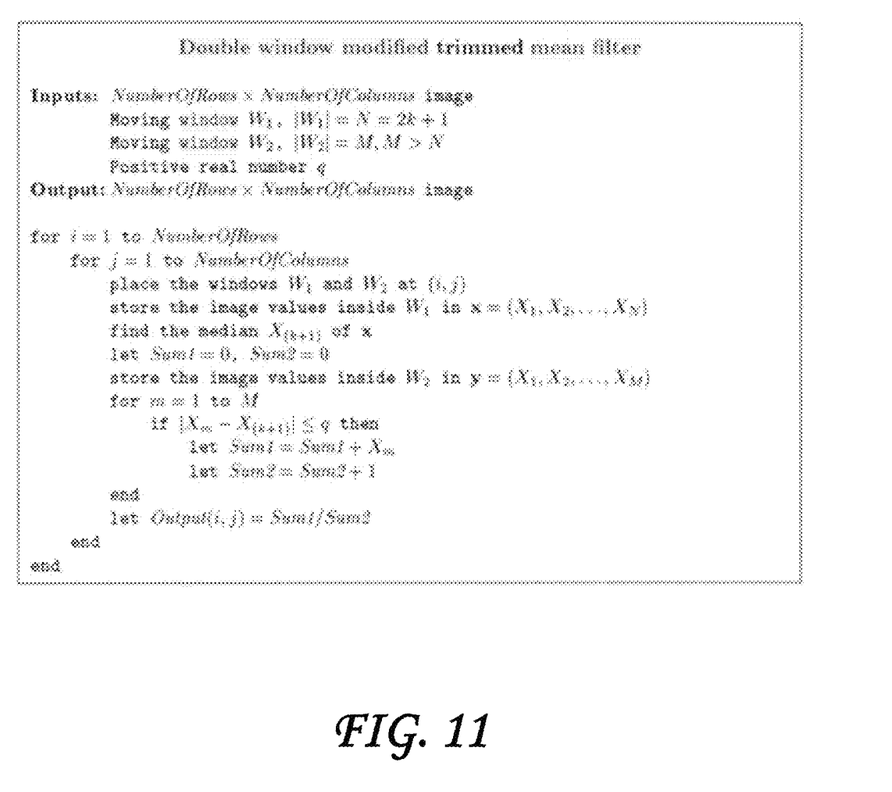
FIG. 11 illustrates one embodiment of an algorithm for image enhancement/noise reduction techniques using a Double Window Modified Trimmed Mean Filter.

In one embodiment, subsequent to image capture and super-resolution enhancement of the millimeter wave image, the millimeter wave, color and infra-red images may then be subjected to image enhancement algorithms as determined by control parameters. Image enhancement techniques may include, but are not limited to, contrast enhancement, noise reduction, spatial range expansion, thresholding, convolutions, and image filtering (sharpen, blur, erode, high pass, low pass), Gaussian noise reduction and DWMTMF (Double Window Modified Trimmed Mean Filter). One example of image enhancement/noise reduction techniques, the Double Window Modified Trimmed Mean Filter as illustrated in FIG. 11.

In one embodiment, the system includes sophisticated analysis algorithms to determine if the scene is empty or if it contains a person. The analysis may be based on the size, intensity and distribution of the current image data, and/or comparing the image with the previously learned "empty" background image, and/or evaluating motion between successive image fields/frames.

In one embodiment, the system continually performs image analysis; constantly scanning new fields and frames from the imagers of the scene (field of view) as determined by software-based capture rate settings. Any changes made to the operating parameters are made concurrent with the system's normal operation, eliminating the need to place the system "offline" to implement changes. In this "idle" state, the system's algorithms additionally perform self monitoring (and optionally self testing) to verify the system is operating correctly. Items monitored or tested during operation may include, but not be limited to, chassis temperature, internal temperature, external temperature, sensor temperature, voltage levels, servo feedback for the diverting gate, etc.

During the "idle" state when the image analysis determines that the scene is empty, the system may also be programmed to perform periodic learn modes for the background scene, either replacing previously learned data or adding to the software's learned database. This activity may be governed according to the rules set forth by the learn enable, dwell timing, time since last learn, manual intervention, or a request by the algorithm itself should it determine that the recent idle scenes are becoming too dissimilar to the learned scene.

While each empty scene may not be added to the learned background image data, each empty scene may contribute to the sensitivity map which remembers pixel swings and alarm probabilities for each individual pixel. In one embodiment, a learned scene is stored in a pixel map, replacing the previous learned scene. In another embodiment, a learned scene is combined with previous learned scenes using a weighted average technique. In a third embodiment, an algorithm may use a captured image as a learned scene only if no motion has been detected for a preset or adjustable amount of time or quantity of image frames.

In one embodiment, the invention may enter a "motion detected" state when the algorithms determine that an object(s) have entered the scene. In this state, the algorithms continually monitor the intrusion based on criteria including, but not limited to, location, size, shape, contrast, distribution direction of motion and speed of motion. Motion analysis is one example of the invention's ability to process and evaluate multiple fields/frames of imagery to effectively evaluate a scene. The system may adaptively select the inspection criteria based on the person's movement in the scene, and may optionally selectively inhibit subsequent inspection based on the person's movement in the scene.

In one embodiment, once the intrusion has been classified by the invention to be a valid person(s) in the scene, the invention enters a "person detected" state. The image data is further analyzed together with the results of earlier consecutive frames to determine the relative distance and direction of travel of the subject. This enables additional algorithms to track the motion of the person(s), calculate its distance, separate the person(s) from the scene algorithmically for subsequent analysis, and ultimately perform concealed object detection on the person(s).

In one embodiment, the invention may use sophisticated algorithms to extract the boundary of the subject from the background. The separation analysis consists of a variety of techniques and algorithms such as connected graphs, contour following/prediction, topographical analysis and variational expectation-maximization algorithms. Additionally, the separation algorithms can include more conventional techniques such as pixel level analysis, edge detection, and blob analysis. Similar to the background analysis, the separation analysis can be implemented to operate on one or more of the available image sources: millimeter wave image, video image and infra-red image.

In one embodiment, the separation algorithm may employ special techniques to reduce or eliminate false results when a concealed object is placed at or near the boundary edge of the person. The separation algorithm may perform curve tracing and predictive following, and can also distinguish between possible concealed objects by comparing the underlying background image pixels (via the learn background pixel map) to the possible concealed object pixels (concealed objects will typically have different pixel values from the learned background). This is similar to not only comparing the contrast of a concealed object vs. person, but also comparing the contrast of a concealed object vs. the background. Pixels from all three sources (millimeter wave, color video and infra-red) may be evaluated.

The results of the separation routine can be, in one embodiment, stored as an internal person pixel map with pixels ranging from 0 to 255 where the value indicates the confidence that a particular pixel represents the background or the subject. The software may provide the option of tracing the boundaries of the subject over the millimeter wave image display data using fine-line highlights (will not obscure millimeter wave data).

The analysis may be implemented so as to be able to distinguish between an approaching/departing person, a person stationary in the camera's sweet-spot, a person turning in the sweet-spot, and a close-up torso-only view of the person at a close distance from the camera. Each classification of the image is evaluated in conjunction with the results of earlier consecutive frames to enhance the reliability of the decision.

In one embodiment, the invention may track the movement of the detected person(s) across multiple fields or frames of imagery. The invention may determine if a person is beyond the desired detection range (either too close or too far from the camera) and suppress further analysis when the subject is out-of-bounds. The bounding area can optionally be implemented to be graphically displayed via highlights on the image display and an indication will appear showing that the subject is not being analyzed (in one embodiment, the fine-line outline of the person would change color).

The aforementioned allows the system to delay the concealed object detection phase until the person is at the optimal distance to perform this phase. This also allows the system to terminate early the concealed object detection phase once a person has left the optimal distance to perform this phase. This also allows the concealed object detection phase to use differing algorithms, methodology and/or parameters when it is calculated that a person is in the normal camera range versus an up-close or zoomed camera range.

Based on the classification of the image, a collection of appropriate detection algorithms can be, in one embodiment, executed via a micro-executive routine. The invention may optionally display a small indicator icon in the corner of the user interface to differentiate the subject's movements: empty, approaching, leaving, stopped, rotating, and close-up.

For each event in which a person is detected, the invention may choose (based on its parameters) to record the event either statistically or visually, or both. When recording an event, the invention may be programmed to include relevant detection data and settings, providing forensic evidence as to why a person and/or concealed object was or was not detected.

The scene analysis routine may be performed up to three times, once for each available image source: the millimeter wave image, the video image and the IR image (if available). Each image source can include its own learned background image and sensitivity maps. The results of each image source will be combined and evaluated for a high-confidence indication of the scene's contents.

In one embodiment, once in the person detected state, the invention will analyze and evaluate the imagery for indications of a concealed object(s). Should a concealed object be detected by the algorithms, the software will provide indication in the user interface and optionally control external hardware enabling the locking or unlocking of doors or turnstiles in the inspection area to detain or release the subject for subsequent action/assessment by a human operator.

Concealed object detection uses a variety of analysis algorithms including feature extraction, blob analysis and symmetry analysis. For blob analysis, each possible concealed object area will be evaluated for a number of characteristics including, but not limited to, contrast, size, distribution, and shape. In addition to analysis of individual suspect areas on a person, the concealed object detection routine may evaluate the cumulative effect of multiple suspect areas appearing on the same person.

While the invention has been particularly shown and described with reference to a preferred embodiment thereof, it will be understood by those skilled in the art that various changes in form and details may be made therein without departing from the spirit and scope of invention.

We claim:

1. A method comprising the steps of:
    receiving image data from a millimeter wave imaging device comprising at least one scan of a scene,
    enhancing the image data, using at least one computing device, using at least one enhancement method, thereby creating enhanced image data comprising a plurality of enhanced image pixels;
    evaluating the enhanced image data, using the at least one computing device, using at least one identification method, thereby identifying at least one subject within the enhanced image data;
    separating the at least one subject from a background within the enhanced image data, using the at least one computing device, using at least one separation method;
    enhancing contrast of the at least one subject within the enhanced image data, using the at least one computing device, using at least one enhancement method, thereby creating enhanced contrast image data;
    detecting concealed physical objects associated with the at least one subject within the enhanced contrast image data, using the computing device, using at least one detection method, thereby detecting at least one concealed physical object associated with the at least one subject;
    displaying a representation of the at least one subject and the at least one concealed physical object on a display device.

2. The method of claim 1 wherein the at least one enhancement method comprises a dithering and sub-pixel resolution enhancement method.

3. The method of claim 2 wherein the dithering and sub-pixel resolution enhancement method comprises a 2-pixel average sub-pixel dither method.

4. The method of claim 3 wherein the image data comprises at least a first scan of the scene comprising a first plurality of pixels and at least a second scan of the scene comprising a second plurality of pixels, wherein the first plurality of image pixels overlaps the second plurality of image pixels by 1 h pixel in a horizontal and a vertical direction of the at least a first scan and the at least a second scan, wherein each enhanced image pixel comprises four sub-pixels, each sub-pixel representing the overlap of one of the first plurality of image pixels and one of the second plurality of image pixels, wherein each enhanced image sub-pixel is created from a 2-point average between the overlapping one of the first plurality of image pixels and one of the second plurality of image pixels.

5. The method of claim 2
    wherein the image data comprises at least a first scan of the scene comprising a first plurality of pixels and at least a second scan of the scene comprising a second plurality of pixels,
    wherein the first plurality of image pixels overlaps the second plurality of image pixels by 1 h pixel in a horizontal and a vertical direction of the at least a first scan and the at least a second scan,
    wherein each enhanced image pixel comprises four sub-pixels, each subpixel representing the overlap of one of the first plurality of image pixels and one of the second plurality of image pixels, wherein the value of each sub-pixel of each of the plurality of enhanced image pixels is calculated as follows:
    Let "A","B", "C" and "D" represent four pixels of the at least a first scan arranged in a first 2 pixel×2 pixel pattern, wherein:
        "A" is at a upper left corner of the pattern;
        "B" is at a upper right corner of the pattern;
        "C" is at a lower left corner of the pattern;
        "D" is at a lower right corner of the pattern;
    Let "a","b", "c" and "d" represent four pixels of the at least a first scan arranged in a second 2 pixel×2 pixel pattern, wherein:
        "a" is at a upper left corner of the pattern;
        "b" is at a upper right corner of the pattern;
        "c" is at a lower left corner of the pattern;
        "d" is at a lower right corner of the pattern;
    Let the first and second patterns overlap such that an upper left quadrant of "a" overlaps the lower right quadrant of "D";
    Let "Sub-pixel" represent the sub-pixel defined by the overlap of the upper left quadrant of "a" and the lower right quadrant of "D";
    Then, the value of the sub-pixel is computed as follows:

$$\text{Sub-pixel} = \frac{1}{2}(a+D).$$

6. The method of claim 5 wherein the value of the sub-pixel is computed as follows:

$$\text{Sub-pixel} = 114[a+D+114(B+D+a+b)+114(C+D+a+c)].$$

7. The method of claim 5 wherein the value of the sub-pixel is computed as follows:

$$\text{Sub-pixel} = 114[6/4a+6/4\,D+114(B+b+C+c)].$$

8. The method of claim 5 wherein the value of the sub-pixel is computed as follows:

$$\text{Sub-pixel} = \tfrac{3}{8}(a+D)+\tfrac{1}{16}(B+b+C+c).$$

9. The method of claim 5 wherein the value of the sub-pixel is computed as follows:

Sub-pixel=[6(a+D)+(B+b+C+c)]/16.

10. The method of claim 5 wherein the value of the sub-pixel is computed as follows:

Sub-pixel=($7/18$a+$3/18$b+$3/18$c+$1/18$d)+($1/18$A+$3/18$B+$3/18$C+$7/18$D).

11. The method of claim 5 wherein the value of the sub-pixel is computed as follows:

Sub-pixel=(7a+3b+3c+d+A+3B+3C+7D)/18.

12. The method of claim 5 wherein the value of the sub-pixel is computed as follows:

Sub-pixel=[7(a+D)+3(b+c+B+C)+d+A]/18.

13. The method of claim 1 wherein the at least one enhancement method is selected from the list: contrast enhancement, noise reduction, spatial range expansion, thresholding, convolutions, image filtering, Gaussian noise reduction and DWMTMF (Double Window Modified Trimmed Mean Filter).

14. The method of claim 1 wherein the at least one identification method is based on the size, intensity and distribution of data in the image data.

15. The method of claim 1 wherein the at least one identification method compares the image with an empty background image.

16. The method of claim 1 wherein the at least one identification method evaluates motion between successive scans of the scene.

17. The method of claim 1 wherein the at least one separation method comprises at least one of the following methods: connected graphs, contour following/prediction, topographical analysis and variational expectation maximization algorithms.

18. The method of claim 1 wherein the at least one separation method comprises at least one of the following methods: pixel level analysis, edge detection, and blob analysis.

19. The method of claim 1 wherein the at least one detection method detects the at least one concealed object by detecting a contrast within the image data relating to the at least one subject.

20. The method of claim 1 wherein the at least one detection method detects the at least one concealed object by detecting areas of greater pixel and lesser pixel value within the image data relating to the at least one subject.

21. The method of claim 1 wherein the at least one detection method detects the at least one concealed object by evaluating an edge of the at least one concealed object within the image data relating to the scene.

22. The method of claim 21 wherein the edge of the at least one concealed object within the image data relating to the scene is evaluated using one of the following techniques: Laplace convolutions, Laplace transforms, single gradient image processing, and double gradient image processing.

23. The method of claim 1 wherein the at least one detection method detects the at least one concealed object by evaluating the at least one concealed object texture, smoothness or spatial frequency with respect to the texture, smoothness or spatial frequency of the at least one subject.

24. The method of claim 1 wherein the at least one detection method detects the at least one concealed object by evaluating absolute pixel values of image data relating to the at least one concealed object.

25. The method of claim 1 wherein displaying a representation of the at least one subject and the at least one concealed physical object on a display device comprises a Blue Man display, wherein concealed objects are indicated using computer generated colored highlights overlaying a location of the at least one concealed object and indicating the size and severity of the at least one concealed object.

26. A computer-readable medium having computer-executable instructions for a method comprising the steps of:
receiving image data from a millimeter wave imaging device comprising at least one scan of a scene,
enhancing the image data, using at least one computing device, using at least one enhancement method, thereby creating enhanced image data comprising a plurality of enhanced image pixels;
evaluating the scene within the enhanced image data, using the at least one computing device, using at least one identification method, thereby identifying at least one subject within the scene;
separating the at least one subject from the scene background, using the at least one computing device using at least one separation method;
enhancing contrast of the at least one subject, using the at least one computing device, using at least one enhancement method, thereby creating enhanced contrast image data;
detecting concealed physical objects associated with the at least one subject within the enhanced contrast image data, using the computing device,
using at least one detection method, thereby detecting method at least one concealed object associated with the at least one subject;
displaying a representation of the at least one subject and the at least one concealed physical object on a display device.

27. The computer-readable medium of claim 26 wherein the at least one enhancement method comprises a dithering and sub-pixel resolution enhancement method.

28. The computer-readable medium of claim 27 wherein the dithering and sub-pixel resolution enhancement method comprises a 2-pixel average sub-pixel dither method.

29. The computer-readable medium of claim 28 wherein the image data comprises at least a first scan of the scene comprising a first plurality of pixels and at least a second scan of the scene comprising a second plurality of pixels, wherein the first plurality of image pixels overlaps the second plurality of image pixels by 1 h pixel in a horizontal and a vertical direction of the at least a first scan and the at least a second scan, wherein each enhanced image pixel comprises four sub-pixels, each sub-pixel representing the overlap of one of the first plurality of image pixels and one of the second plurality of image pixels, wherein each enhanced image sub-pixel is created from a 2-point average between the overlapping one of the first plurality of image pixels and one of the second plurality of image pixels.

30. The computer-readable medium of claim 27
wherein the image data comprises at least a first scan of the scene comprising a first plurality of pixels and at least a second scan of the scene comprising a second plurality of pixels,
wherein the first plurality of image pixels overlaps the second plurality of image pixels by 1 h pixel in a horizontal and a vertical direction of the at least a first scan and the at least a second scan,
wherein each enhanced image pixel comprises four sub-pixels, each subpixel representing the overlap of one of the first plurality of image pixels and one of the second plurality of image pixels, wherein the value of each sub-pixel of each of the plurality of enhanced image pixels is calculated as follows:

Let "A","B", "C" and "D" represent four pixels of the at least a first scan arranged in a first 2 pixel×2 pixel pattern, wherein:
"A" is at a upper left corner of the pattern;
"B" is at a upper right corner of the pattern;
"C" is at a lower left corner of the pattern;
"D" is at a lower right corner of the pattern;

Let "a","b", "c" and "d" represent four pixels of the at least a first scan arranged in a second 2 pixel×2 pixel pattern, wherein:
"a" is at a upper left corner of the pattern;
"b" is at a upper right corner of the pattern;
"c" is at a lower left corner of the pattern;
"d" is at a lower right corner of the pattern;

Let the first and second patterns overlap such that an upper left quadrant of "a" overlaps the lower right quadrant of "D";

Let "Sub-pixel" represent the sub-pixel defined by the overlap of the upper left quadrant of "a" and the lower right quadrant of "D";

Then, the value of the sub-pixel is computed as follows:

Sub-pixel=½(a+D).

31. The computer-readable medium of claim 30 wherein the value of the sub-pixel is computed as follows:

Sub-pixel=1/14[a+D+1/14(B+D+a+b)+1/14(C+D+a+c)].

32. The computer-readable medium of claim 30 wherein the value of the sub-pixel is computed as follows:

Sub-pixel=1/14[6/4 a+6/4 D+1/14(B+b+C+c)].

33. The computer-readable medium of claim 30 wherein the value of the sub-pixel is computed as follows:

Sub-pixel=⅜(a+D)+1/16(B+b+C+c).

34. The computer-readable medium of claim 30 wherein the value of the sub-pixel is computed as follows:

Sub-pixel=[6(a+D)+(B+b+C+c)]/16.

35. The computer-readable medium of claim 30 wherein the value of the sub-pixel is computed as follows:

Sub-pixel=(7/18a+3/18b+3/18c+1/18+(1/18A+3/18B+3/18C+7/18D).

36. The computer-readable medium of claim 30 wherein the value of the sub-pixel is computed as follows:

Sub-pixel=(7a+3b+3c+d+A+3B+3C+7D)/18.

37. The computer-readable medium of claim 30 wherein the value of the sub-pixel is computed as follows:

Sub-pixel[7(a+D)+3(b+c+B+C)+d+A]/18.

38. The method of claim 26 wherein the at least one enhancement method is selected from the list: contrast enhancement, noise reduction, spatial range expansion, thresholding, convolutions, image filtering, Gaussian noise reduction and DWMTMF (Double Window Modified Trimmed Mean Filter).

39. The computer-readable medium of claim 26 wherein the at least one identification method is based on the size, intensity and distribution of data in the image data.

40. The computer-readable medium of claim 26 wherein the at least one identification method compares the image with an empty background image.

41. The computer-readable medium of claim 26 wherein the at least one identification method evaluates motion between successive scans of the scene.

42. The computer-readable medium of claim 26 wherein the at least one separation method comprises at least one of the following methods: connected graphs, contour following/prediction, topographical analysis and variational expectation maximization algorithms.

43. The computer-readable medium of claim 26 wherein the at least one separation method comprises at least one of the following methods: pixel level analysis, edge detection, and blob analysis.

44. The computer-readable medium of claim 26 wherein the at least one detection method detects the at least one concealed object by detecting a contrast within the image data relating to the at least one subject.

45. The computer-readable medium of claim 26 wherein the at least one detection method detects the at least one concealed object by detecting areas of greater pixel and lesser pixel value within the image data relating to the at least one subject.

46. The computer-readable medium of claim 26 wherein the at least one detection method detects the at least one concealed object by evaluating an edge of the at least one concealed object within the image data relating to the scene.

47. The computer-readable medium of claim 46 wherein the edge of the at least one concealed object within the image data relating to the scene is evaluated using one of the following techniques: Laplace convolutions, Laplace transforms, single gradient image processing, and double gradient image processing.

48. The computer-readable medium of claim 26 wherein the at least one detection method detects the at least one concealed object by evaluating the at least one concealed object texture, smoothness or spatial frequency with respect to the texture, smoothness or spatial frequency of the at least one subject.

49. The computer-readable medium of claim 26 wherein the at least one detection method detects the at least one concealed object by evaluating absolute pixel values of image data relating to the at least one concealed object.

50. The computer-readable medium of claim 26 wherein displaying a representation of the at least one subject and the at least one concealed physical object on a display device comprises a Blue Man display, wherein concealed objects are indicated using computer generated colored highlights overlaying a location of the at least one concealed object and indicating the size and severity of the at least one concealed object.

* * * * *